US 7,184,386 B2

United States Patent
Nikolai et al.

(12) United States Patent
Nikolai et al.

(10) Patent No.: US 7,184,386 B2
(45) Date of Patent: Feb. 27, 2007

(54) INTEGRATED TYPE OPTICAL HEAD WITH SHEET WAVEGUIDE AND LIGHT COUPLER

(75) Inventors: Petrov Nikolai, Kyungki-do (KR);
Jin-seung Sohn, Seoul (KR);
Eun-hyoung Cho, Kyungki-do (KR);
Myung-bok Lee, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 374 days.

(21) Appl. No.: 10/319,469

(22) Filed: Dec. 16, 2002

(65) Prior Publication Data

US 2004/0042377 A1     Mar. 4, 2004

(30) Foreign Application Priority Data

Sep. 2, 2002   (KR) ............................. 2002-52461

(51) Int. Cl.
*G11B 7/135*    (2006.01)

(52) U.S. Cl. ............................. 369/112.09; 369/112.27
(58) Field of Classification Search ........... 369/112.27, 369/112.09, 112.21, 112.14
See application file for complete search history.

(56) References Cited

U.S. PATENT DOCUMENTS

| | | | | |
|---|---|---|---|---|
| 4,059,338 A | * | 11/1977 | Hartelius, Jr. ........... | 369/112.27 |
| 4,672,187 A | * | 6/1987 | Fujita et al. ............ | 369/112.12 |
| 4,716,559 A | * | 12/1987 | Hine ...................... | 369/112.27 |
| 4,779,259 A | | 10/1988 | Kono et al. | |

(Continued)

FOREIGN PATENT DOCUMENTS

JP     60202553 A  * 10/1985

(Continued)

OTHER PUBLICATIONS

Notice to Submit Response issued by the Korean Patent Office in corresponding application 10-2002-0052461 on Jun. 28, 2004.

(Continued)

*Primary Examiner*—Andrea Wellington
*Assistant Examiner*—Peter Vincent Agustin
(74) *Attorney, Agent, or Firm*—Buchanan Ingersoll & Rooney PC

(57) ABSTRACT

An integrated optical head is provided. In the integrated optical head, a light source emits light. A waveguide guides the light. An input coupler is located at one edge of the waveguide, and couples light emitted from the light source and transmits the coupled light to the waveguide. An output coupler is located at another edge of the waveguide, and couples light emitted from the waveguide and focuses the coupled light on an optical disc. A light path changing unit is installed on the waveguide, and changes the light path of light that has been reflected by the optical disc and then passed through the output coupler. An optical detector receives the light passed through the light path changing unit and converts the received light into an electrical signal in order to detect information from the optical disc Accordingly, an input coupling efficiency and an output coupling efficiency are improved, such that light loss is reduced. Thus, recording and reproduction of an optical head can be improved, and a light, compact, integrated optical head can be obtained.

11 Claims, 13 Drawing Sheets

U.S. PATENT DOCUMENTS

| | | | |
|---|---|---|---|
| 4,853,919 A | * 8/1989 | Miyawaki et al. | 369/112.21 |
| 4,858,215 A | * 8/1989 | Yano et al. | 369/44.24 |
| 5,070,488 A | * 12/1991 | Fukushima et al. | 369/112.27 |
| 5,111,449 A | * 5/1992 | Kurata et al. | 369/112.24 |
| 5,161,148 A | * 11/1992 | Hori et al. | 369/112.14 |
| 5,191,624 A | * 3/1993 | Ito et al. | 369/44.11 |
| 5,224,193 A | * 6/1993 | Risk | 369/112.27 |
| 5,276,745 A | * 1/1994 | Revelli, Jr. | 369/44.12 |
| 5,278,812 A | * 1/1994 | Adar et al. | 369/112.27 |
| 5,481,516 A | * 1/1996 | Kim | 369/112.27 |
| 5,652,737 A | * 7/1997 | Minami et al. | 369/112.27 |
| 5,684,900 A | * 11/1997 | Nishiwaki et al. | 385/31 |
| 5,701,289 A | 12/1997 | Nagano | |
| 5,757,755 A | * 5/1998 | Nagano | 369/112.12 |
| 5,781,676 A | 7/1998 | Okada | |
| 6,631,234 B1 | * 10/2003 | Russell et al. | 385/125 |
| 2001/0012149 A1 | * 8/2001 | Lin et al. | 359/344 |

FOREIGN PATENT DOCUMENTS

| | | | |
|---|---|---|---|
| JP | 60263350 A | * | 12/1985 |
| JP | 62088150 A | * | 4/1987 |
| JP | 01236436 A | * | 9/1989 |
| JP | 01271931 A | * | 10/1989 |
| JP | 04-289531 | | 10/1992 |
| KR | 1994-0020324 | | 9/1994 |

OTHER PUBLICATIONS

Chinese Office Action and English translation.

* cited by examiner

INTEGRATED TYPE OPTICAL HEAD WITH SHEET WAVEGUIDE AND LIGHT COUPLER

BACKGROUND OF THE INVENTION

This application claims the priority of Korean Patent Application No. 02-52461, filed Sep. 2, 2002 in the Korean Intellectual Property Office, the disclosure of which is incorporated herein in its entirety by reference.

FIELD OF THE INVENTION

The present invention relates to an optical head for recording information on and reading information from an optical disc, and more particularly, to an integrated optical head having an input coupler and an output coupler, the couplers which use an evanescent coupling effect or a light diffraction effect.

DESCRIPTION OF THE RELATED ART

FIG. 1 is a schematic view of a conventional optical head assembly. Referring to FIG. 1, a conventional optical head assembly includes a laser diode 1, a collimating lens 5, a beam splitter 6, an objective lens 7, and an optical detector 8.

A laser beam radiated from the laser diode 1 is collimated by the collimating lens 5. Then, the collimated beam passes through the beam splitter 6 and is focused by the objective lens 7 so as to form a spot 4 on an optical disc 3 Part of incident beam reflected by the optical disc 3 goes back into the beam splitter 6. Then, the optical path of the reflected beam is changed by 90 degrees by the beam splitter 6 so that the reflected beam is incident upon the optical detector 8. Thereafter, the optical detector 8 converts the incident beam into an electrical signal. A differential amplifier 9 detects a difference between the output signals of two sections into which the optical detector 8 is divided, and produces a tracking error signal FIGS. 2A and 2B show an optical head assembly disclosed in the U.S. Pat. No. 4,779,259. The optical head assembly includes an optical integrated circuit (IC) in which optical elements are integrated by a single etching process in order to achieve a light, compact optical head assembly.

Referring to FIG. 2A, a buffer layer 42 is formed on a substrate 41 by oxidation or vapor deposition, and a light guiding layer 43 is formed as a dielectric thin film on the buffer layer 42 by vapor deposition or the like. A collimating lens 45, a beam splitter 46, and a converging-type grating coupler 47 are installed on the light guiding layer 43 by photolithography, electron beam drawings, or plasma etching. The converging-type grating coupler 47 has a plurality of unequally spaced curves. Reference numeral 44 denotes a laser diode to radiate a laser beam, and reference numeral 48 denotes an optical detector having two light receiving elements. The optical detector 48 is attached to one edge of the optical head assembly such that its center is aligned with the optical axis of incident light. Reference numeral 49 denotes an optical disc, and reference numeral 50 denotes information-recorded pits on the optical disc A laser beam emitted from the laser diode 44, attached to another edge of the optical IC-type head assembly, passes through the light guiding layer 43 and is collimated by the collimating lens 45. The collimated beam passes over the light guiding layer 43 and is then focused by the grating coupler 47 to form spots on the information pits 50 on the optical disc 49. Part of the incident beam reflected by the optical disc 49 goes back into the grating coupler 47 and passes over the light guiding layer 43 toward the beam splitter 46. The beam incident upon the beam splitter 46 is reflected so as to go toward the optical detector 49.

FIG. 2B shows another embodiment of the optical head assembly of U.S. Pat. No. 4,779,259. The same reference numerals as those of FIG. 2A denote the same elements. Reference numeral 52 denotes a beam splitter located between the laser diode 44 and the grating coupler 47. Reference numerals $54_1$, $54_2$, $54_3$, and $54_4$ denote the detection surfaces of an optical detector built in the light guiding layer 43

A laser beam emitted from the laser diode 44 passes through the light guiding layer 43 and is focused by the grating coupler 47 to form a spot on the surface of the optical disc 49. Part of the incident laser beam reflected by the optical disc 49 passes through the grating coupler 47 and is divided into two beams by the beam splitter 52. Then, the two beams are directed toward and received by the detection surfaces $54_1$, $54_2$, $54_3$, and $54_4$ of the optical detector.

In such an optical IC-type head assembly, an input coupling efficiency between a laser diode and a light guiding layer and an output coupling efficiency between the light guiding layer and an optical disc are degraded, such that the output intensity of light does not reach the intensity for recording and reproducing information. Also, since a grating coupler has a small number of apertures, it provides a low focusing intensity. In addition, the detection sensibility of an optical detector with respect to a variation in the wavelength of light reflected by the optical disc is deteriorated.

SUMMARY OF THE INVENTION

To solve the above and other problems, it is an aspect of the present invention to provide a compact, integrated optical head for providing an optical intensity required for recording and reproduction by improving an input coupling efficiency between a light source and a light guiding layer and an output coupling efficiency between the light guiding layer and an optical disc.

The above and other aspects of the present invention are achieved by an integrated optical head including a light source, a waveguide, an output coupler, a light path changing unit, and an optical detector. The input coupler is located at one edge of the waveguide and couples light emitted from the light source and transmits the coupled light to the waveguide. The output coupler is located at another edge of the waveguide, couples light emitted from the waveguide, and focuses the coupled light on an optical disc. The light path changing unit is installed on the waveguide and changes the light path of light that has been reflected by the optical disc and then has passed through the output coupler. The optical detector receives the light passed through the light path converting unit and converts the received light into an electrical signal in order to detect information from the optical disc.

Preferably, the input coupler is an evanescent coupler, which includes an optical fiber, whose one end is connected to the light source, other end is connected to the surface of the waveguide, and core is closely attached to the surface of the waveguide, and evanescent-couples the light emitted from the light source and transmits the coupled light to the waveguide.

Alternatively, it is preferable that the input coupler is a prism coupler, which is close to the surface of the waveguide, evanescent-couples the light emitted from the light source, and transmits the coupled light to the waveguide.

Here, the evanescent coupling has a phase matching condition that satisfies the following equation:

$$2d(n_0^2 - n_{ef}^2)^{1/2} = m\lambda_0$$

wherein d denotes a thickness of the waveguide, m denotes a mode order, $n_0$ denotes a refractive index of the waveguide, and $n_{ef}$ denotes an effective refractive index of the optical fiber.

Preferably, the input coupler is a grating coupler, which is formed on the surface of the waveguide, diffracts light emitted from the light source, and transmits the coupled light to the waveguide.

Alternatively, it is preferable that the input coupler is a tapered coupler, which has a tapered end such that light entering through a rear end of the waveguide travels while being totally reflected.

The light source is a laser diode.

The integrated optical head may further include an optical fiber for connecting the light source to the input coupler. Alternatively, the integrated optical head may further include an optical fiber whose one end is connected to the light source and other end is inserted into a rear end of the waveguide.

Preferably, the integrated optical head further includes a collimating lens between the light source and the input coupler.

The waveguide includes a substrate, a buffer layer, and a light guiding layer. The buffer layer is deposited on the upper surface of the substrate. The light guiding layer is deposited on the upper surface of the buffer layer and guides the light.

The light path changing unit includes a photonic crystal mirror and a mode index lens. The photonic crystal mirror has a plurality of holes formed through the buffer layer in order to change the light path of light received from the output coupler. The mode index lens focuses light passed through the photonic crystal mirror on the optical detector.

Alternatively, the light path changing unit is a grating beam splitter formed on the surface of the waveguide It is preferable that the output coupler is a focusing grating coupler formed on the buffer layer of the waveguide in such a way that each grating has a predetermined curvature and a pitch is reduced in the traveling direction of the light, the focusing grating coupler diffracting light passed through the light guiding layer such that the light is focused on the optical disc.

It is also preferable that the output coupler is a focusing grating coupler formed on the surface of the waveguide in such a way that each grating has a predetermined curvature and a pitch is reduced in the traveling direction of the light, the focusing grating coupler diffracting light passed through the light guiding layer such that the light is focused on the optical disc.

It is also preferable that the output coupler is a prism coupler installed close to the surface of the waveguide, the prism coupler evanescent-coupling light emitted from the waveguide and focusing the coupled light on the optical disc.

It is also preferable that the output coupler is a focusing grating coupler formed on the surface of the waveguide, the prism coupler diffracting light passed through the waveguide so that the light is focused on the optical disc.

Preferably, the integrated optical head further includes a cylindrical lens formed on the light path between the output coupler and the optical disc in order to focus light passed through the output coupler on the optical disc.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Figure 1:
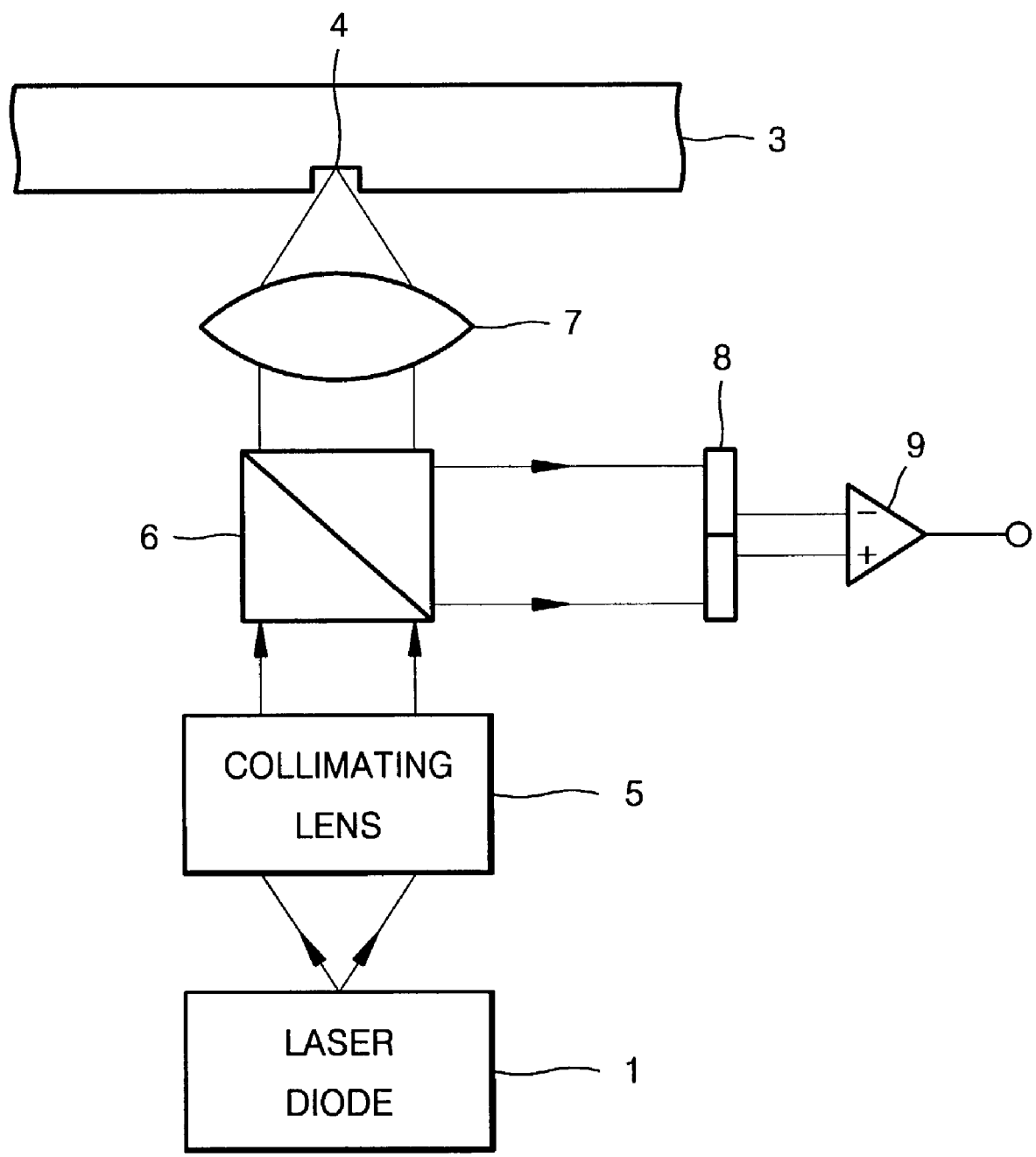
FIG. 1 is a diagrammatic illustration of a conventional optical head.
Figure 2A:
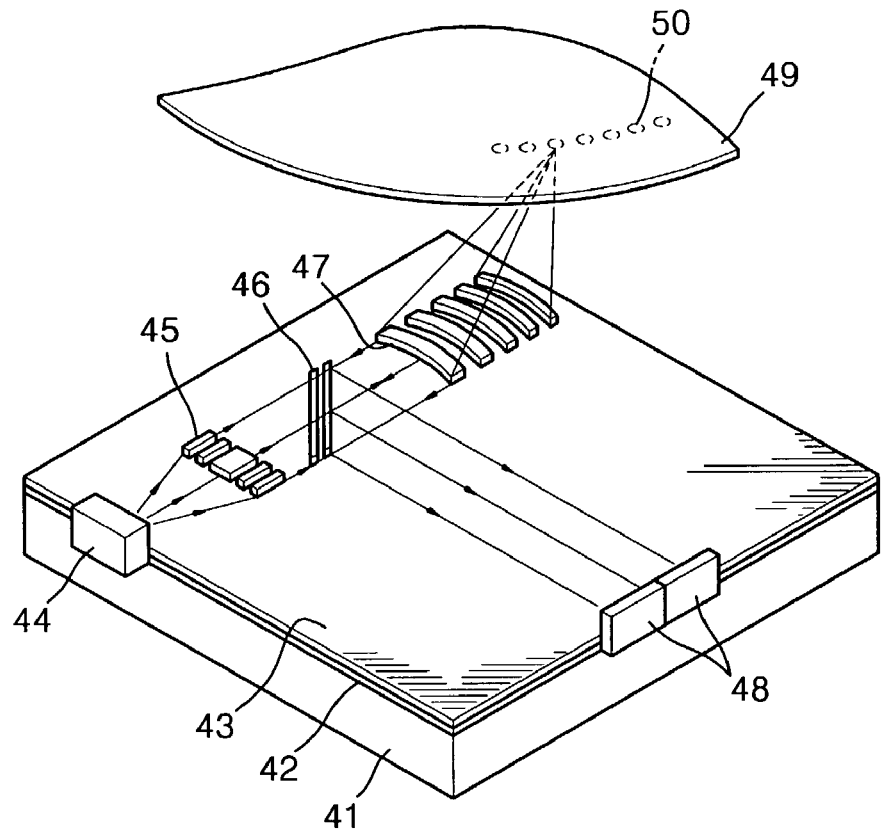
FIGS. 2A and 2B are perspective views of embodiments of an optical head disclosed in the U.S. Pat. No. 4,779,259.
Figure 2B:
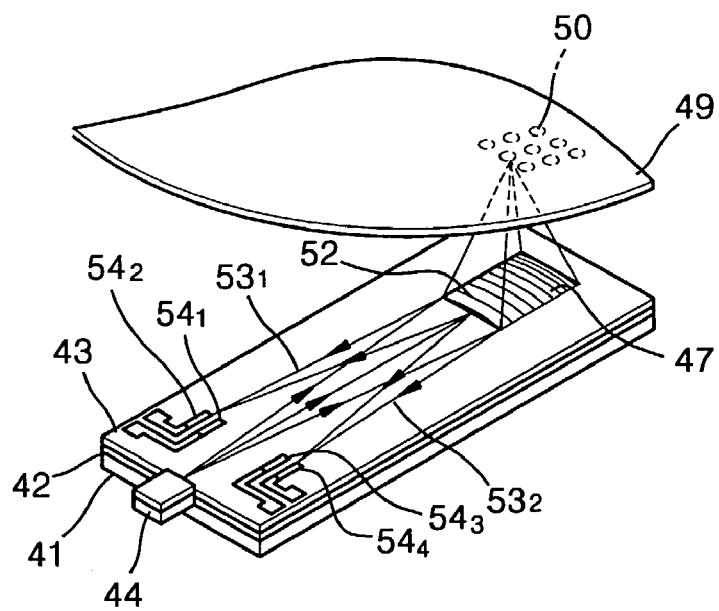
Figure 3:
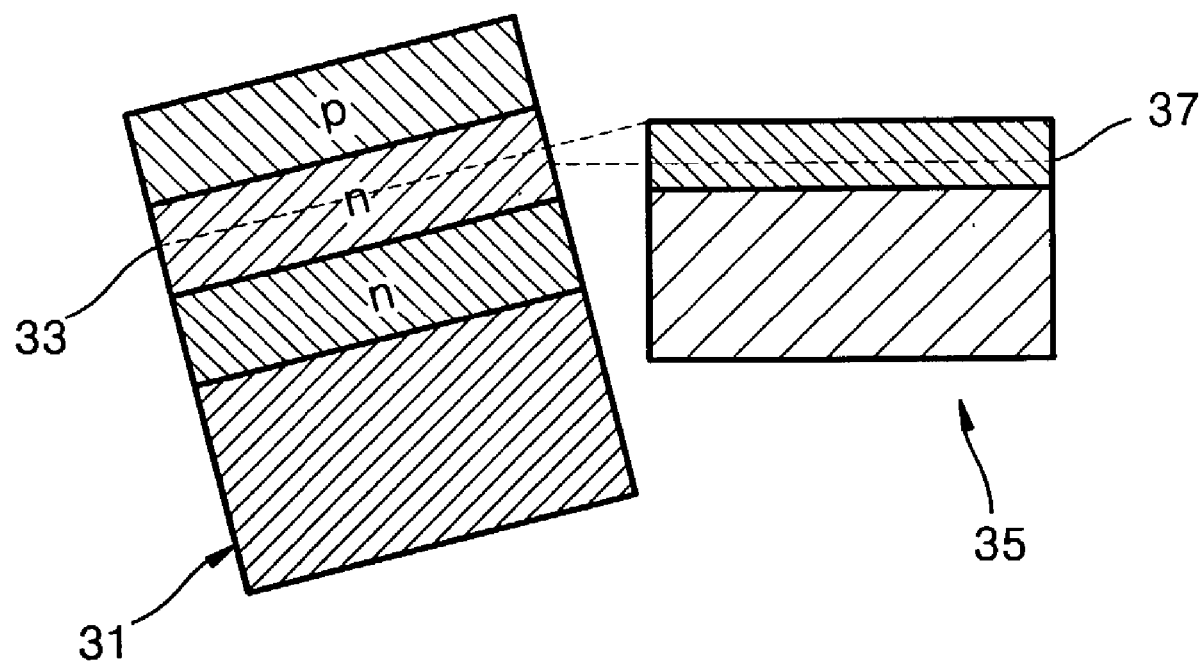
FIG. 3 is a schematic diagram of an end-butt coupling technique to couple a laser diode and a waveguide.

The present invention adopts four coupling techniques improved from a conventional end-butt coupling technique. In an end-butt coupling technique for coupling a conventional laser diode to a light guiding layer, as shown in FIG. 3, a beam emitted from an active layer 33 in a laser diode 31 is simply connected to a light guiding layer 37 in a waveguide 35. When light from the laser diode 31 having a Gaussian profile is incident upon the light guiding layer 37 in the waveguide 35, a coupling efficiency is determined by a convolution of a field pattern according to Equation 2 with respect to an incident laser beam and a waveguide mode:

$$|c_m|^2 = \left| \frac{\oint_{-d/2}^{d/2} E_y(x) E_{my}(x) dx}{\oint_{-d/2}^{d/2} E_{my}^{2(x)} dx} \right|^2 \quad (2)$$

wherein $E_y(x)$ denotes an amplitude distribution of an incident laser beam, and $E_{my}(x)$ denotes an amplitude distribution of an m-th waveguide mode. In order to achieve a high efficiency, the distance between elements must be minimized, and a profile matching condition must be satisfied. Here, a profile matching means that a similar light intensity is distributed on a laser diode and on a waveguide.

Since the surfaces of the laser diode and waveguide have a Fresnel lens type roughness, an optical loss may occur on the surface of the laser diode while light is being emitted from the laser diode, and another optical loss may occur while the light emitted from the laser diode is incident upon the surface of the waveguide. Such an optical loss is called a Fresnel reflection loss. The Fresnel reflection loss can be reduced by reflectionless-coating the surfaces of the laser diode and the waveguide or filling the gap between the surfaces with an appropriate material. An experiment on this reported that a coupling efficiency of about 10% was obtained between a laser diode and a waveguide. Hence, according to the end-butt coupling technique, a coupling efficiency is degraded due to problems generated in end surface processing and an arrangement and fixation of the laser diode and the waveguide.

In order to solve the problem of the conventional end-butt coupling technique, an evanescent coupler, a prism coupler, a grating coupler, and a tapered coupler are used. An evanescent coupler and a prism coupler adopt an evanescent field coupling method. A grating coupler uses a light diffraction effect. A tapered coupler applies full reflection conditions. The four couplers can be installed between a light source and a waveguide, but the evanescent coupler and the tapered coupler cannot be installed between the waveguide and an optical disc to couple them.

First through fourth embodiments that adopt the four couplers, respectively, as an input coupler between a light source and a waveguide, will now be described. Here, an output coupler uses a conventional focusing grating coupler.

<First Embodiment>

Figure 4:
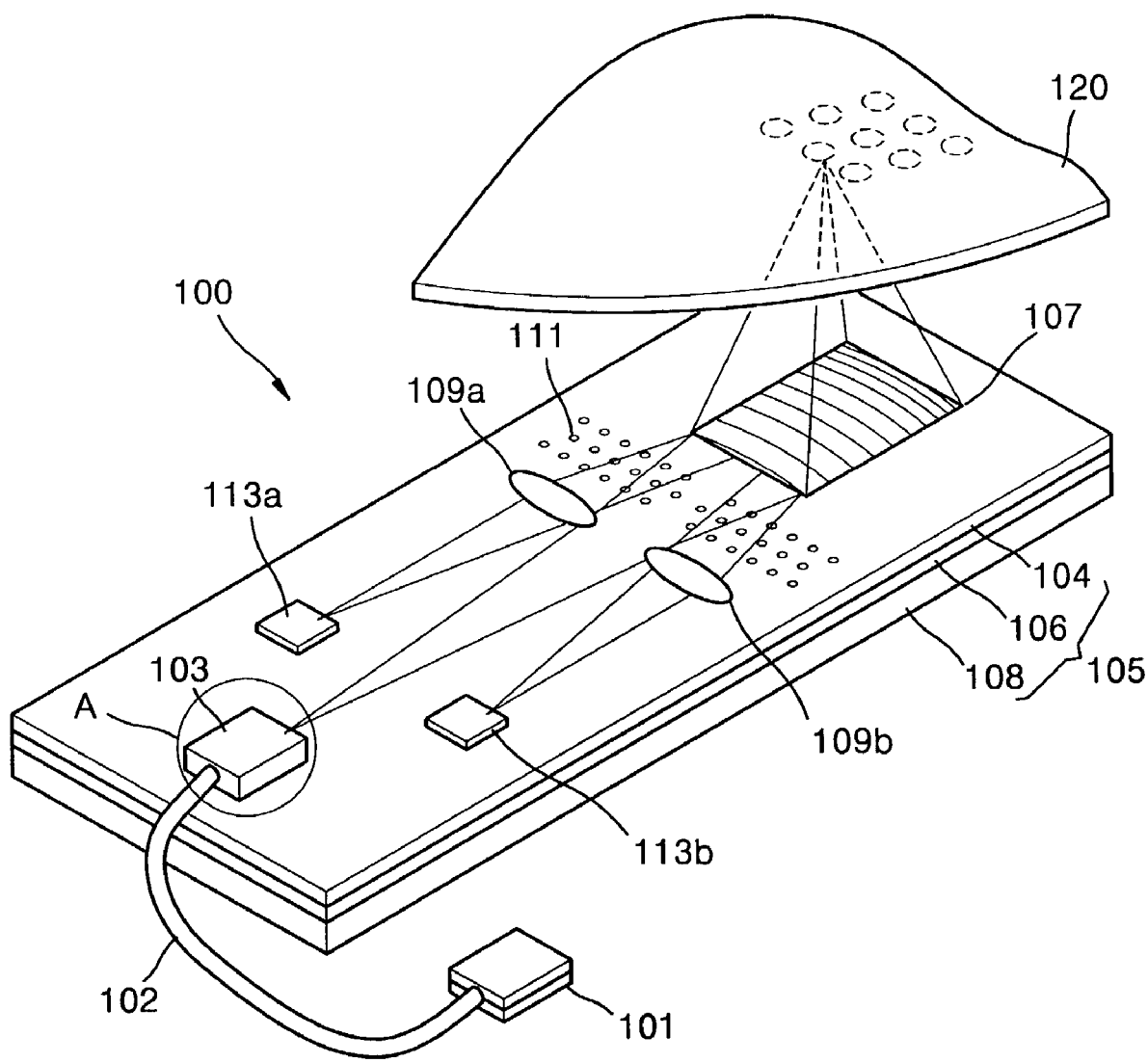
FIG. 4 is a perspective view of an optical head adopting an evanescent coupler, according to a first embodiment of the present invention.

FIG. 4 is a perspective view of an optical head adopting an evanescent coupler, according to the first embodiment of the present invention. Referring to FIG. 4, a laser diode 101 is used as a light source. An evanescent coupler 103 couples an optical fiber 102 to a waveguide 105. The waveguide 105 guides light passed through the evanescent coupler 103. A focusing grating coupler 107 diffracts light from the waveguide 105 onto an optical disc 120. A photonic crystal mirror 111 serves as a light path changing unit for changing the path of light that has been reflected by the optical disc 120 and passed through the focusing grating coupler 107. Mode index lenses 109a and 109b focus the light passed through the photonic crystal mirror 111 on optical detectors 113a and 113b. The optical detectors 113a and 113b convert the received light into an electrical signal. The waveguide 105 is formed by stacking a buffer layer 106 and a light guiding layer 104 on a substrate 108.

Instead of the laser diode 101, an optical device capable of recording information on and reproducing information from the optical disc 120, such as, a laser emitting diode, can be used as a light source.

The focusing grating coupler 107 is formed by waving the surface of the buffer layer 106 in the waveguide 105 and stacking the light guiding layer 104 on the uneven surface of the buffer layer 106. The focusing grating coupler 107 is composed of a plurality of gratings, which are disposed perpendicular to the traveling direction of light. The gratings have a reduced pitch between themselves and have a predetermined curvature, such that they focus incident light on the surface of the optical disc 120. The focusing grating coupler 107 has gratings formed with appropriate pitches to thus perform focusing, which is the function of an objective lens in a conventional optical head Instead of the focusing grating coupler 107, a general grating coupler, which is formed on a surface, or a conventional objective lens can be used.

The photonic crystal mirror 111 performs a light path changing function, which is conventionally performed by a beam splitter in a conventional optical head. The photonic crystal mirror 111 is obtained by forming a plurality of holes in the buffer layer 106 interposed between the light guiding layer 104 and the substrate 108 in the waveguide 105. The photonic crystal mirror 111 is an artificial structure composed of periodically-spaced holes formed on a dielectric material layer in order to affect a light path.

The photonic crystal mirror 111 changes a light path by diffraction other than refraction. The optical characteristics of the photonic crystal mirror 111 are determined by an air fill factor (f=hole area/entire area) and a lattice constant (a/λ: a denotes a proportional coefficient and λ denotes a wavelength). Instead of the photonic crystal mirror 111, a beam splitter with a grating structure can be used. However, the photonic crystal mirror 111 has an advantage in that it can be simply manufactured by forming a plurality of holes in the buffer layer 106 on the substrate 108 without using an extra material layer The mode index lenses 109a and 109b may be installed on the top surface of the waveguide 105 or formed by injecting ions into the waveguide 105 and changing the refractive index of the portion of the waveguide 105 into which ions are injected The mode index lenses 109a and 109b focus light beams of two optical paths produced by the photo crystal mirror 111 on the optical detectors 113a and 113b.

The photonic crystal mirror 111 and the mode index lenses 109a and 109b can be replaced by a grating beam splitter. However, since the grating beam splitter cannot perform precise focusing, the optical heads according to the first through fourth embodiments of the present invention adopt both the photonic crystal mirror 111 and the mode index lenses 109a and 109b in order to focus light of an effectively changed light path on the optical detectors 113a and 113b.

The evanescent coupler 103 adopted in the optical head according to the first embodiment of the present invention will now be described in detail with reference to FIG. 5A, which is a magnified view of a portion A of FIG. 4.

Figure 5A:
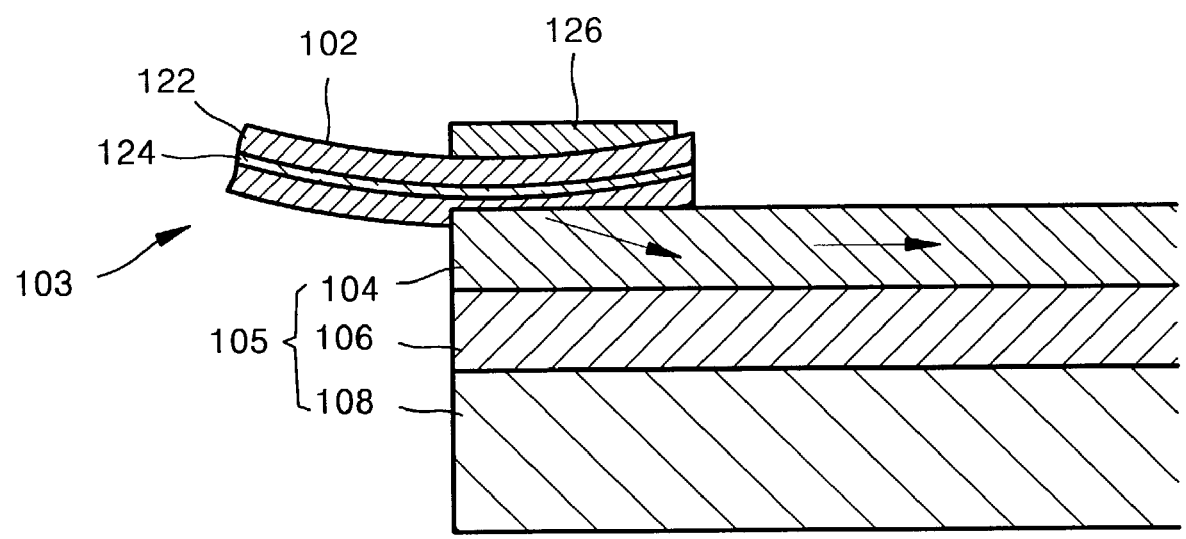
FIG. 5A is a cross-section of an evanescent coupler.

Referring to FIG. 5A, the evanescent coupler 103 is completed by contacting the optical fiber 102 and the waveguide 105 and then coupling the contacted portion with a fiber block 126 A clad 122 between the optical fiber 102 and the waveguide 103 has a thickness of several microns Light emitted from a highly refractive core 124 in the optical fiber 102 tunnels its way through the clad 122 having a low refractive index and a micron thickness and enters the light guiding layer 104 having a high refractive index. The light (l) incident upon the light guiding layer 104 travels in an evanescent wave because of evanescent coupling. The evanescent wave incident upon the waveguide 105 mostly enters the light guiding layer 104, and part of the evanescent wave penetrates the buffer layer 106. However, the evanescent wave is seldom directed toward the substrate 108. The evanescent wave travels parallel to the incidence surface of the waveguide 105 decreases in intensity as it advances.

Evanescent coupling will now be described in detail with reference to FIG. 5B. Since light incident upon the waveguide 105 without coupling typically does not belong to a radiation mode of the light guiding layer 104, it cannot propagate through the light guiding layer 104. In order for light emitted from the laser diode 101 to travel through the light guiding layer 104, coupling must be performed so that a vertical light component with a phase speed is formed same between in the case of light traveling through the waveguide 105 and light being incident upon the waveguide 105.

A phase matching condition between a general light beam and a waveguide is expressed as in Equation 3:

$$\beta_m = k n_1 \sin\theta_m = \frac{2\pi}{\lambda_0} n_1 \sin\theta_m \quad (3)$$

wherein $\beta_m$ denotes a waveguide mode propagation constant, k denotes a wave number, $n_1$ denotes the refractive index of air, $\lambda_0$ denotes the wavelength of light, and $\theta_m$ denotes the incidence angle of light with respect to a waveguide.

In the optical head according to the first embodiment of the present invention, light incident upon the light guiding layer 104 has a waveguide mode propagation constant $\beta_m$ that satisfies Equation 4:

$$\beta_m > k n_1 \quad (4)$$

Accordingly, a result as presented in Equation 4 is obtained from Equations 2 and 3, but an impossible value is presented in Equation 5:

$$\sin\theta_m > 1 \quad (5)$$

Figure 5B:
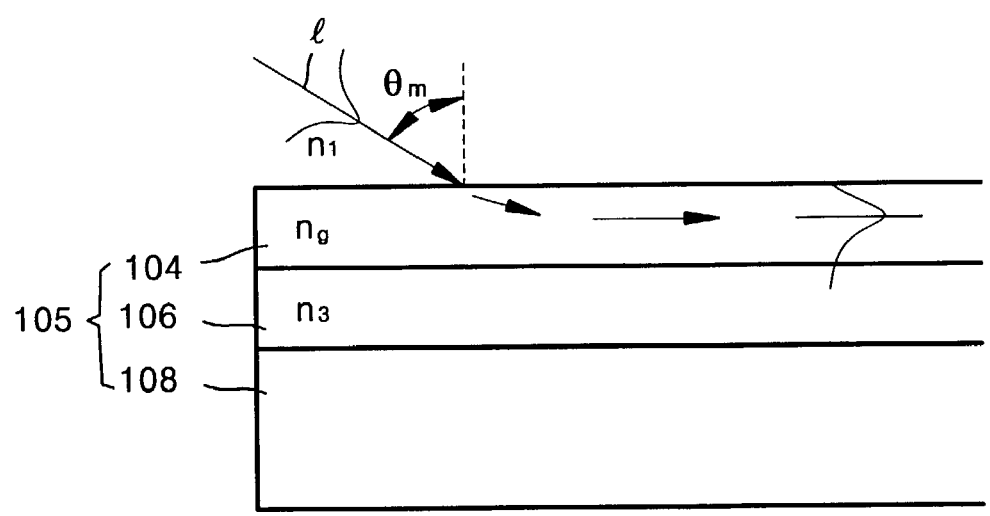
FIG. 5B is a conceptual diagram of an evanescent coupling technique.

Hence, a phase matching condition for evanescent field coupling is presented as in Equation 1 In FIG. 5B, $n_g$ denotes the refractive index of the light guiding layer 104, and $n_3$ denotes the refractive index of the buffer layer 106.

In the optical head according to the first embodiment of the present invention, evanescent coupling can provide a coupling efficiency of no less than 95%. Referring to FIG. 5B, light has a symmetrical light intensity distribution, before the light is incident upon the waveguide 105. However, when light is incident upon the light guiding layer 104 and travels through it, the light has an asymmetrical light intensity distribution in which the inclination of a light intensity distribution toward the substrate becomes gentle because of part of the incident light that penetrates into the substrate.

Since an evanescent coupler couples a laser diode and a waveguide to an optical fiber, an extra heat sink does not need to be installed. Thus, a more compact optical head can be obtained.

<Second Embodiment>

Figure 6:
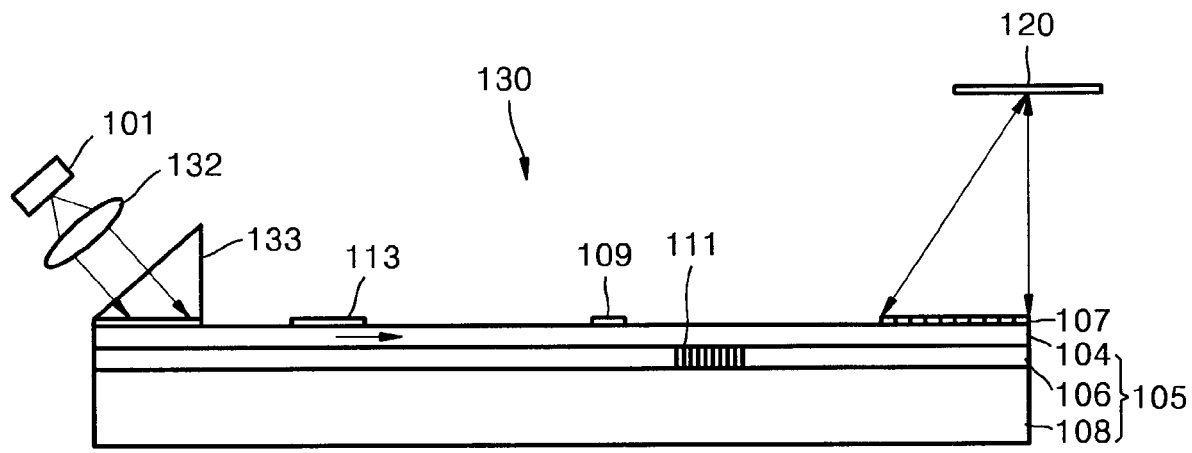
FIG. 6 is a cross-section of an optical head adopting a prism coupler, according to a second embodiment of the present invention.

FIG. 6 is a cross-section of an optical head adopting a prism coupler, according to the second embodiment of the present invention. The prism coupler also adopts the above-described evanescent field coupling technique.

As shown in FIG. 6, an optical head 130 according to the second embodiment of the present invention employs a prism coupler 133 instead of the evanescent coupler 103 in the optical head according to the first embodiment of the present invention. The prism coupler 133 is installed between the laser diode 101 and the waveguide 105. A collimating lens 132 is further provided between the laser diode 101 and the prism coupler 133. The other elements are installed likewise the optical head according to the first embodiment of the present invention.

Light emitted from the laser diode 101 is collimated by the collimating lens 132 and heads toward the prism coupler 133. The light incident upon the prism coupler 133 travels through the waveguide 105 and enters the focusing grating coupler 107. Light emitted from the focusing grating coupler 107 is diffracted and focused on the optical disc 120. Light reflected by the optical disc 120 is incident upon the photonic crystal mirror 111, and its optical path is changed by the photonic crystal mirror 111. Thereafter, the path-changed light is focused by the mode index lenses 109a and 109b and received by the optical detector 113.

If the prism coupler 133 having a refractive index $n_p$ appropriately adjusts the incidence angle of incident light, incident light in a mode where phase matching does not occur is totally reflected by the surface of the prism coupler 133. An optical mode within the prism coupler 133 has a phase constant β p that varies according to the incidence angle of incident light. When a predetermined phase constant β p approaches the waveguide mode propagation constant, that is, a phase constant, $\beta_m$, the optical energy of the incident light can be efficiently transmitted to the light guiding layer 104.

However, in order to achieve such optical energy transmission, the interval between the prism coupler 133 and the light guiding layer 104 needs to be smaller than the wavelength by closely adhering the prism coupler 133 to the light guiding layer 104 in the waveguide 105. In this case, phase matching based on Equation 3 occurs between the mode of the prism coupler 133 and the m-th mode of the light guiding layer 104, such that the energy of the prism coupler 133 can be efficiently transmitted to the light guiding layer 104.

In the structure of the optical head 130 according to the second embodiment of the present invention, if the collimating lens 132 is not used, a coupling efficiency attains to approximately 80%. On the other hand, if the collimating lens 132 is further provided in the optical head 130 and the optical system of the optical head 130 is an infinite optical system over which the distribution of incident light with a total width of w is uniform, a coupling efficiency between the prism coupler 133 and the light guiding layer 104 can approach 100%.

<Third Embodiment>

Figure 7:
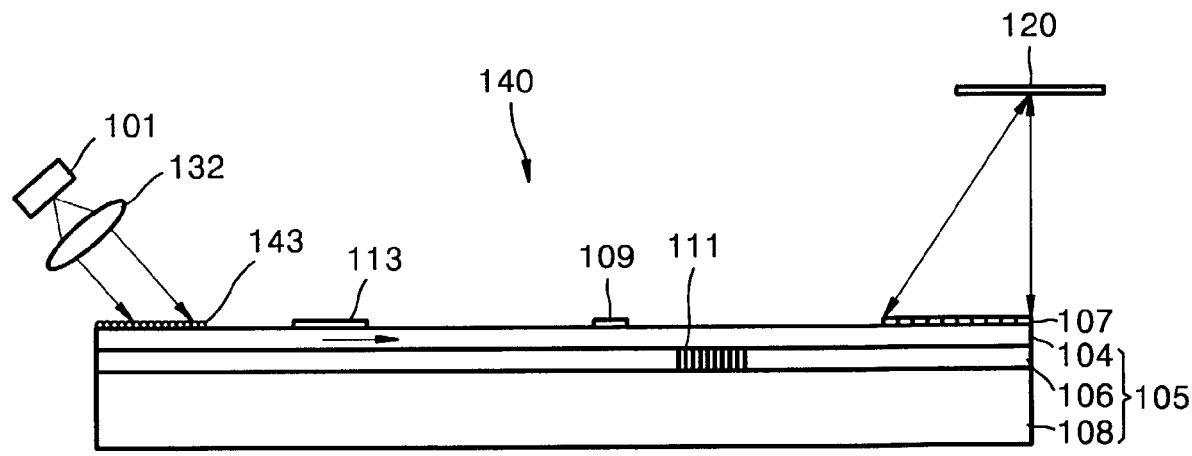
FIG. 7 is a cross-section of an optical head adopting a grating coupler, according to a third embodiment of the present invention.

FIG. 7 is a cross-section of an optical head 140 adopting a grating coupler, according to the third embodiment of the present invention. Referring to FIG. 7, the optical head 140 adopts a grating coupler 143 instead of the prism coupler 133 of the optical head 130 according to the second embodiment of the present invention. The other elements are the same as those of the second embodiment.

The grating coupler 143 converts light received from the light source 101 into diffracted light beams of different orders and changes the mode of light incident upon the waveguide 105 so that the light has a Z-directional propagation constant β v given as in Equation 6. Generally, the basic phase constant β o of the waveguide 105 is similar to the mode β m of a grating-free area. When an optical mode identical or similar to the mode β m of the grating-free area is produced while the light passes through the grating coupler 143, light in the produced mode is dominantly propagated through the light guiding layer 104. Equation 6 is as follows:

$$\beta_v = \beta_0 + v \frac{2\pi}{\Lambda} \quad (6)$$

wherein v is given by 0, ±1, ±2, . . . , and Λ denotes the period of gratings. Accordingly, because of an appropriate adjustment of the incidence angle of incident light, optical coupling occurs between the grating coupler 143 and the waveguide 105, and optical energy can be efficiently transmitted from the grating coupler 143 to the waveguide 105.

The grating coupler 143 is formed while the light guiding layer 104 is formed. Once the grating coupler 143 is formed, it provides a constant coupling efficiency and is not liable to be changed by external environment, such as, vibrations. When light collimated by the collimating lens 132 is incident upon the grating coupler 143 as shown in FIG. 7, the coupling efficiency of the grating coupler 143 can reach no less than 80%.

<Fourth Embodiment>

Figure 8:
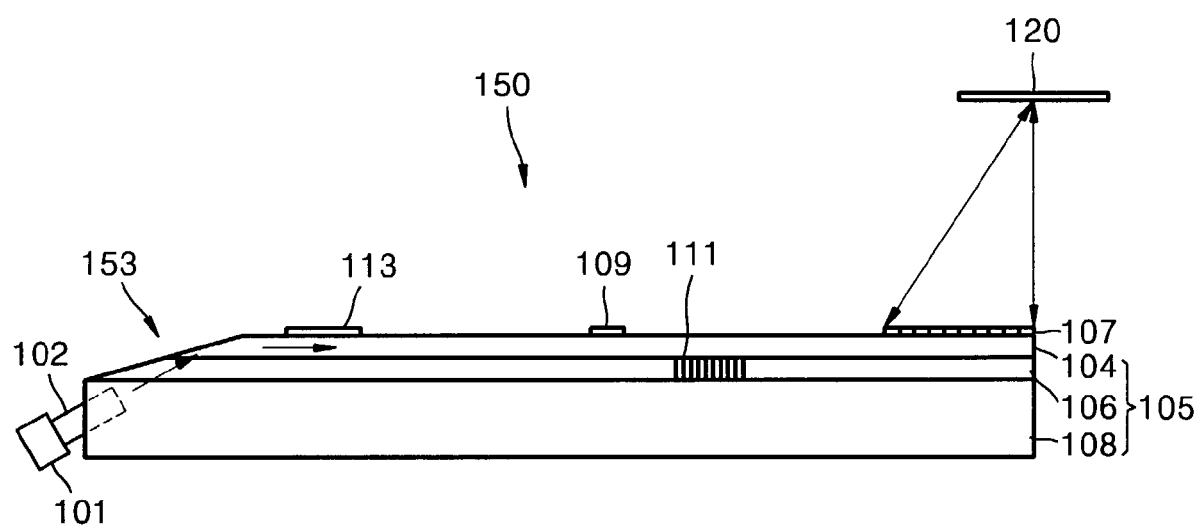
FIG. 8 is a cross-section of an optical head adopting a tapered coupler, according to a fourth embodiment of the present invention.

FIG. 8 is a cross-section of an optical head 150 adopting a tapered coupler, according to the fourth embodiment of the present invention. The optical head 150 includes a tapered coupler 153 manufactured by tapering one end of the light guiding layer 104.

Referring to FIG. 8, the optical head 150 includes the light source 101, the optical fiber 102, the waveguide 105, the focusing grating coupler 107, the photonic crystal mirror 111, the mode index lens 109, and the optical detector 113. The optical fiber 102 is coupled to the light source 101 so that light travels. The waveguide 105 has a rear end into which the optical fiber 102 is inserted. The tapered coupler 153 is formed on the waveguide 105. The focusing grating coupler 107 diffracts light that travels through the waveguide 105, and focuses the light on the optical disc 120. The photonic crystal mirror 111 changes the light path of light reflected by the optical disc 120. The mode index lens 109 focuses light passed through the photonic crystal mirror 111 on the optical detector 113. The optical detector 113 converts the received light into an electrical signal.

As shown in FIG. 8, light emitted from the optical fiber 102 inserted into the substrate 108 is incident upon the surface of the light guiding layer 104 at a total reflection angle and advances while being totally reflected by the upper surface of the light guiding layer 104 and the interface between the light guiding layer 104 and the buffer layer 106. The laser diode 101, the waveguide 105, the focusing grating coupler 107, the photonic crystal mirror 109, the mode index lens 111, and the optical detector 113 operate as described above.

Light incident upon the tapered coupler 153 is incident upon the rear end of the light guiding layer 104, which is tapered depending on the incidence angle, at an angle greater than the total reflection angle, and travels while being continuously totally reflected within the light guiding layer. Hence, the light entering into the light guiding layer 104 is hardly lost in the tapered coupler 153 and advances while being totally reflected, such that a coupling efficiency of about 70% is obtained.

The tapered coupler 153 may cause a small degree of light loss due to a distance between the optical fiber 102 and the substrate 108, such that it provides a little lower coupling efficiency than the above-described three couplers. This defect can be overcome by narrowing the distance between the optical fiber 102 and the light guiding layer 104.

The optical heads using evanescent coupling, light diffraction, and total reflection, according to the first through fourth embodiments of the present invention, improve an input coupling efficiency by coupling the light between a light source and a waveguide.

Optical heads according to fifth through nineteenth embodiments of the present invention to be described hereinafter include both an input coupler between a light source and a waveguide and an output coupler between the waveguide and an optical disc, thereby improving the input coupling efficiency and the output coupling efficiency <Fifth Embodiment>

Figure 9A:
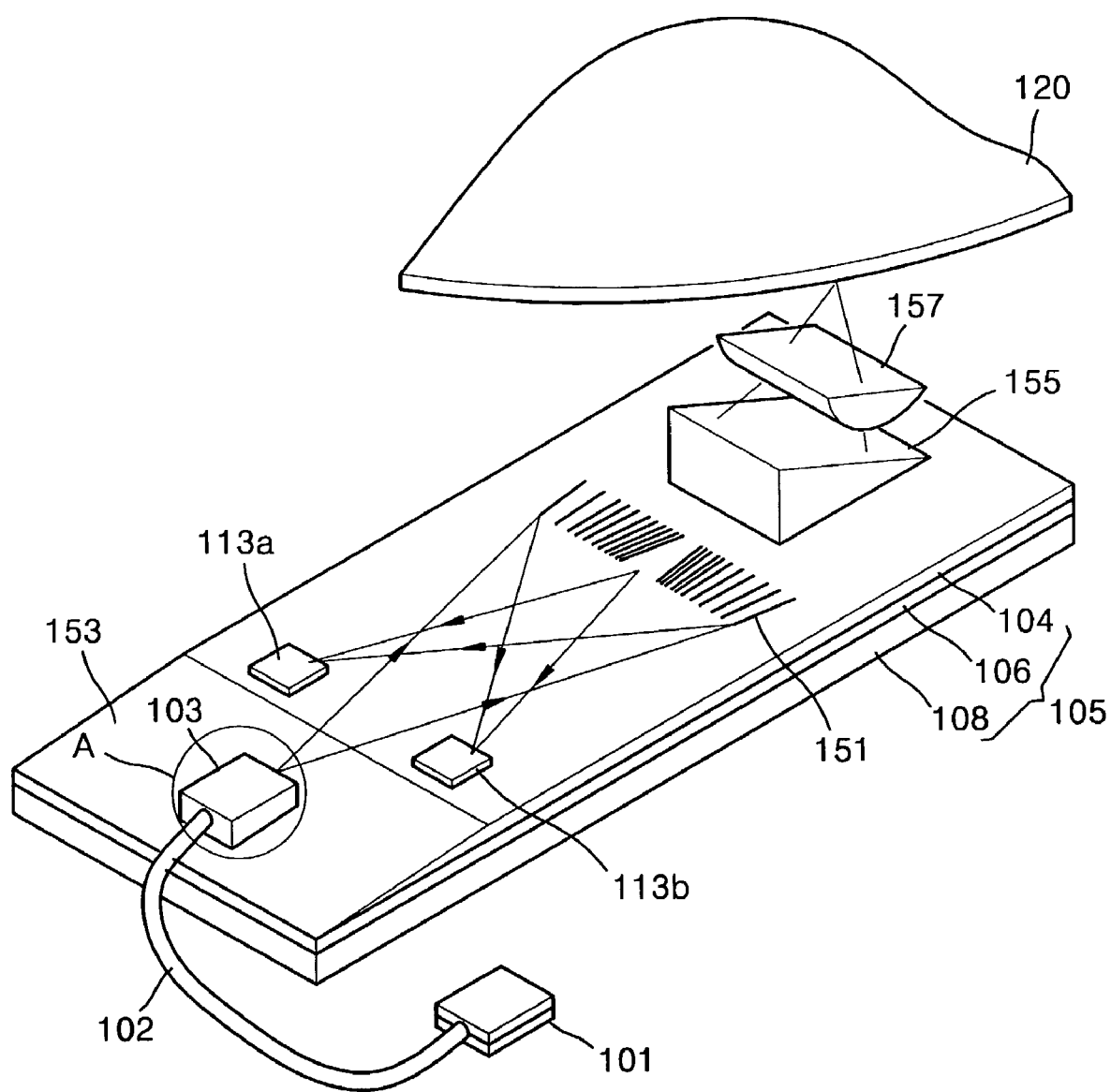
FIG. 9A is a schematic perspective view of an optical head according to a fifth embodiment of the present invention.

FIG. 9A is a schematic perspective view of an optical head according to the fifth embodiment of the present invention. In the optical head, an evanescent coupler and a tapered coupler to serve as input couplers are provided between a light source and a waveguide, and a prism coupler to serve as an output coupler is provided between the waveguide and an optical disc.

Referring to FIG. 9A, light emitted from the laser diode 101 enters the evanescent coupler 103 via the optical fiber 102. Since the evanescent coupler 103 is joined to the tapered coupler 153, the light tunnels its way through the evanescent coupler 103 and enters into the tapered coupler 153. The light incident upon the tapered coupler 153 travels while being totally reflected by the upper surface of the light guiding layer 104 and the interface between the light guiding layer 104 and the buffer layer 106, advances straight through the grating beam splitter 151, and is then emitted from the waveguide 105

The light emitted from the light guiding layer 104 of the waveguide 105 is evanescent coupled into an optical mode similar to the optical mode of the light guiding layer 104 while passing through a prism coupler 155 as an output coupler, and then focused on the optical disc 120 by a cylindrical lens 157. Here, the evanescent coupling acts in the same way as the above-described evanescent coupling acts in the optical head according to the first embodiment. Preferably, as shown in FIG. 9A, the cylindrical lens 157 is further disposed on the light path between the prism coupler 155 and the optical disc 120 in order to more efficiently focus the light emitted from the prism coupler 155 on the optical disc 120.

The light intensity required for recording information on and reproducing information from the optical disc 120 is about 10 mW/μ m². Generally, light loss occurs over the light path from the laser diode 101 to the optical disc 120, such that, in practice, only about 10% of the light intensity emitted from the laser diode 101 is used to record information on and reproduce it from the optical disc. Hence, in the present invention, an input coupler and an output couple are provided between a light source and a waveguide and between the waveguide and an optical disc in order to minimize loss of light intensity, thereby obtaining an optical intensity required for recording data on and reproducing it from the optical disc, particularly, for data recording.

Light reflected by the optical disc 120 travels in the reverse direction to the above-described light path and is divided into two sub-light beams by the grating beam splitter 151. The two sub-light beams head toward the optical detectors 113a and 113b. The optical detectors 113a and 113b converts the receiving light beams into electrical signals in order to detect information from the optical disc. The structure and operation of the optical detectors 113a and 113b are the same as those of a conventional optical head.

In contrast with the first through fourth embodiments of the present invention, the optical head according to the fifth embodiment of the present invention may adopt a prism coupler as an output coupler, instead of a conventional focusing grating coupler, such that a maximum optical intensity can reach an optical disc.

<Sixth Embodiment>

Figure 9B:
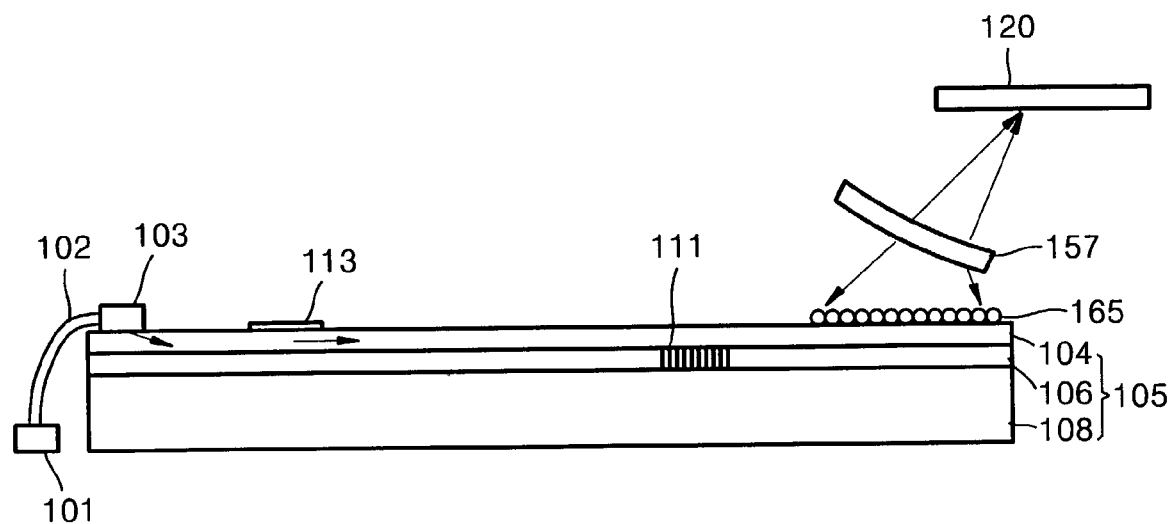
FIG. 9B is a schematic cross-section of an optical head according to a sixth embodiment of the present invention.

FIG. 9B is a schematic cross-section of an optical head according to the sixth embodiment of the present invention. The optical head adopts an evanescent coupler as an input coupler and a focusing grating coupler as an output coupler Referring to FIG. 9B, unlike the first embodiment of the present invention, the optical head according to the sixth embodiment of the present invention has a focusing grating coupler 165 formed on the surface of the light guiding layer 104 of the waveguide 105. The cylindrical lens 157 is provided between the focusing grating coupler 165 and the optical disc 120 in order to more improve a focusing function. The structure and operation of the elements other than the output coupler in the optical head according to the sixth embodiment are the same as those in the optical head according to the fifth embodiment.

The optical head according to the sixth embodiment of the present invention does not include a tapered coupler unlike the fifth embodiment. However, it is apparent that the optical head according to the sixth embodiment can use a taper coupler as another input coupler <Seventh Embodiment>

Figure 9C:
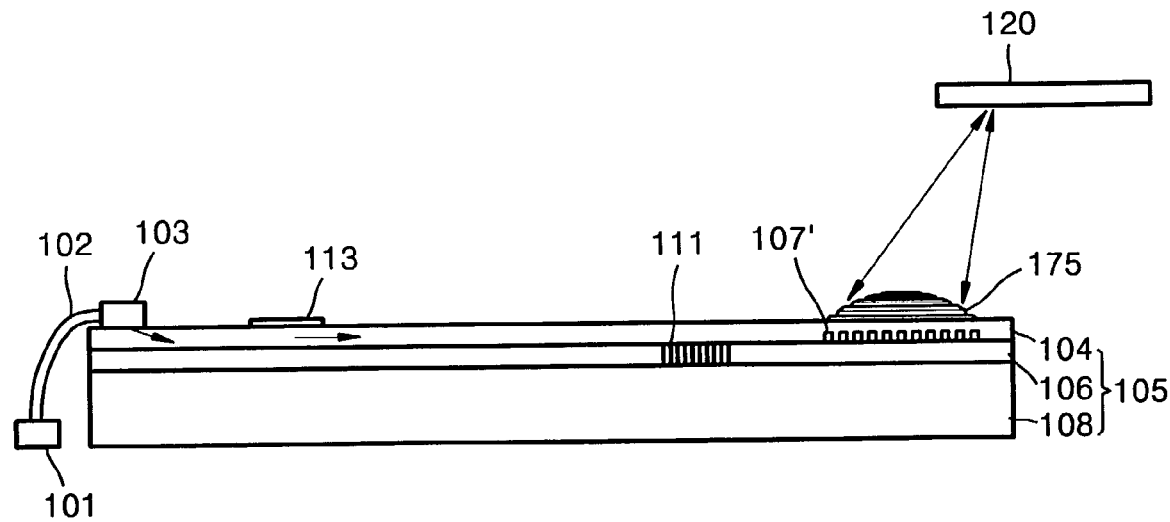
FIG. 9C is a schematic cross-section of an optical head according to a seventh embodiment of the present invention.

FIG. 9C is a schematic cross-section of an optical head according to the seventh embodiment of the present invention. In the seventh embodiment of the present invention, an evanescent coupler is used as an input coupler, a focusing grating coupler to serve as an output coupler is formed between a light guiding layer and a buffer layer, and a Fresnel lens coupler to server as an output coupler is disposed on the upper surface of the light guiding layer.

Referring to FIG. 9C, like the focusing grating coupler 107 in the first through fourth embodiments of the present invention, a focusing grating coupler 107' formed on the buffer layer 106 is designed to reduce a pitch with respect to the traveling direction of light and have a curvature for gratings, such that light is diffracted and focused on the optical disc 120. A Fresnel lens coupler 175 formed on the upper surface of the light guiding layer 104 has a shape of a Fresnel lens having a plurality of annular lenses, uniforms the intensity distribution of light emitted from the focusing grating coupler 107', and then focuses the light to form a spot on the optical disc 120. Hence, a light loss that may occur during output coupling can be reduced.

In this embodiment, a tapered coupler can be further used as an input coupler. The structure and operation of the elements other than the input and output couplers in the seventh embodiment of the present invention are the same as those in the fifth embodiment of the present invention.

<Eighth Embodiment>

Figure 10A:
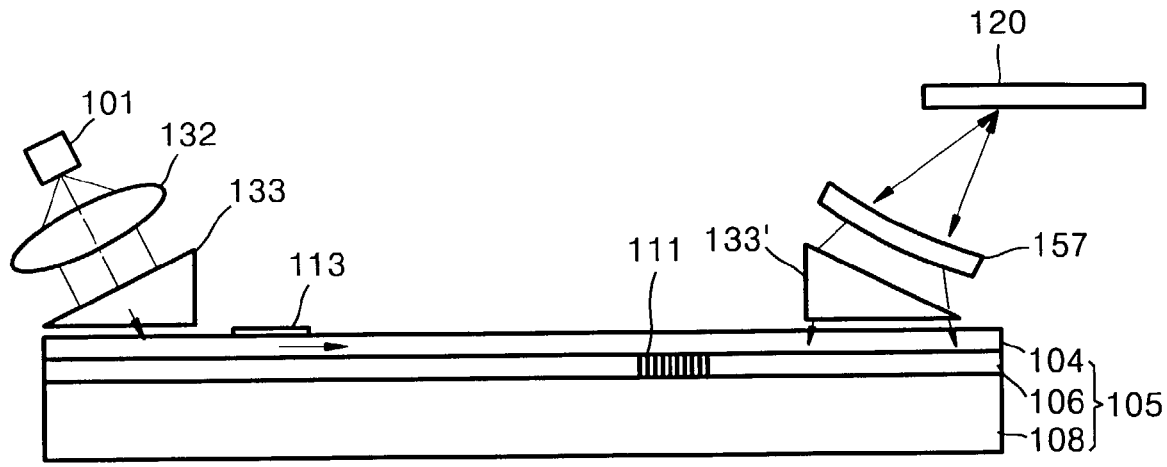
FIG. 10A is a schematic cross-section of an optical head according to an eighth embodiment of the present invention.

FIG. 10A is a schematic cross-section of an optical head according to the eighth embodiment of the present invention. The optical head uses a prism coupler as input and output couplers.

Referring to FIG. 10A, light emitted from the light source 101 is collimated by the collimating lens 132, and the collimated light beams are evanescent coupled into an evanescent wave by the prism coupler 133. Next, the evanescent wave is incident upon the light guiding layer 104. The light wave incident upon the light guiding layer 104 is emitted from a rear end, evanescent coupled again by a prism couple 133', and focused on the optical disc 120 by the cylindrical lens 157.

The phase matching condition for evanescent coupling is equal to what is present as in Equation 5 in the first embodiment of the present invention. The other elements of the optical head according to the eighth embodiment are the same as described for the optical head according to the fifth embodiment of the present invention.

<Ninth Embodiment>

Figure 10B:
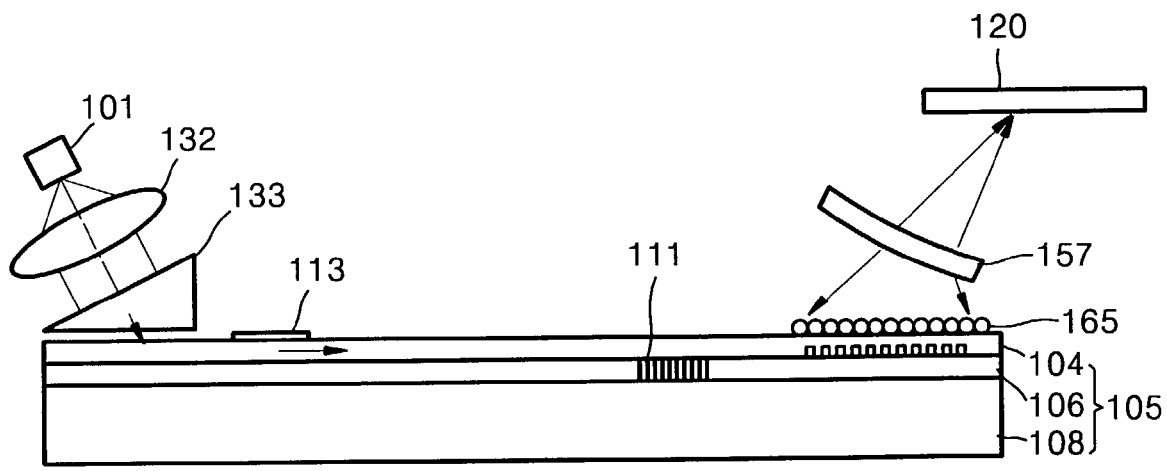
FIG. 10B is a schematic cross-section of an optical head according to a ninth embodiment of the present invention.

FIG. 10B is a schematic cross-section of an optical head according to the ninth embodiment of the present invention. The optical head adopts a prism coupler as an input coupler and adopts a focusing grating coupler as an output coupler.

Referring to FIG. 10B, light emitted from the light source 101 is collimated by the collimating lens 132, and the collimated light beams are evanescent coupled into an evanescent wave by the prism coupler 133. Then, the evanescent wave is incident upon the light guiding layer 104. The light wave incident upon the light guiding layer 104 is diffracted by the focusing grating coupler 165 and focused on the optical disc 120 by the cylindrical lens 157.

The other elements of the optical head according to the eighth embodiment are the same as described for the optical head according to the fifth embodiment of the present invention.

<Tenth Embodiment>

Figure 10C:
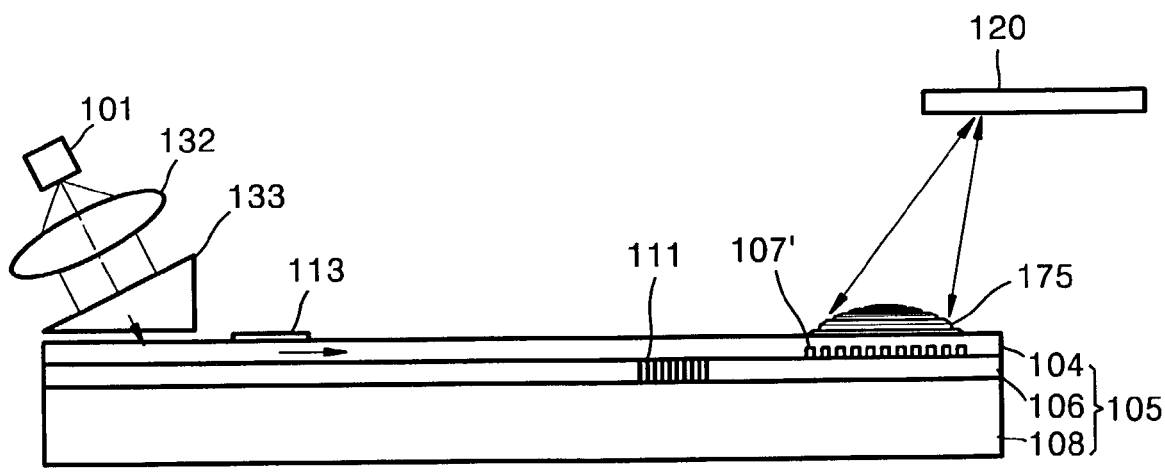
FIG. 10C is a schematic cross-section of an optical head according to a tenth embodiment of the present invention.

FIG. 10C is a schematic cross-section of an optical head according to the tenth embodiment of the present invention. The optical head adopts a prism coupler as an input coupler and adopts a grating coupler and a Fresnel lens coupler as output couplers.

Referring to FIG. 10C, evanescent coupling by the prism coupler 133 occurs as input coupling. Upon output coupling, light is diffracted by the focusing grating coupler 107' and then focused on the optical disc 120 by the Fresnel lens coupler 175.

The prism coupler 133 is the same as that of the optical head according to the second embodiment of the present invention. The structure and operation of the focusing grating coupler 107' and the Fresnel lens coupler 175 are the same as those of the optical head according to the fourth embodiment of the present intention.

<Eleventh Embodiment>

Figure 11A:
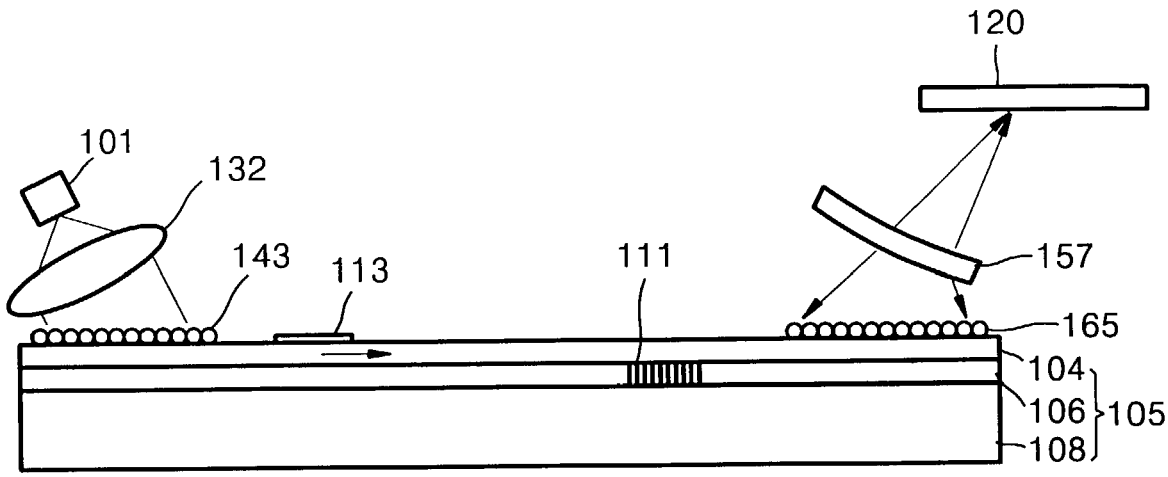
FIG. 11A is a schematic cross-section of an optical head according to an eleventh embodiment of the present invention.

FIG. 11A is a schematic cross-section of an optical head according to the eleventh embodiment of the present invention. The optical head adopts a grating coupler as an input coupler and adopts a prism coupler as an output coupler.

Referring to FIG. 11A, light emitted from the light source 101 is coupled by a grating coupler 143 and then enters into the light guiding layer 104. Light emitted from the light guiding layer 104 is coupled by the focusing grating coupler 165 and then focused on the optical disc 120 by the cylindrical lens 157. The coupling manner of the grating coupler 143 is the same as that in the third embodiment of the present invention.

Since the light paths in the optical heads according to the twelfth through nineteenth embodiments of the present invention are similar to those in the optical heads according to the fifth through eleventh embodiments of the present invention, they will not be described.

<Twelfth Embodiment>

Figure 11B:
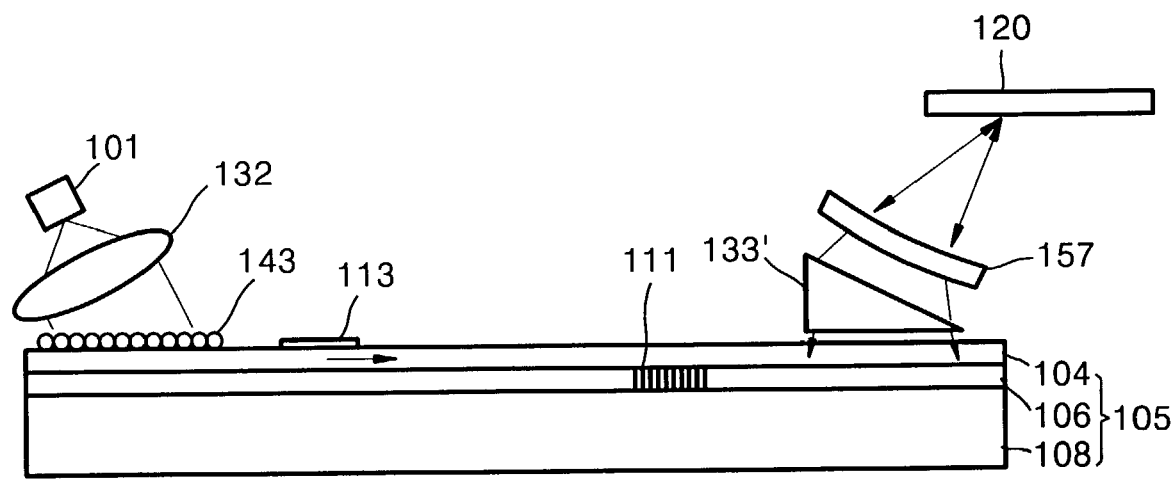
FIG. 11B is a schematic cross-section of an optical head according to a twelfth embodiment of the present invention.

FIG. 11B is a schematic cross-section of an optical head according to the twelfth embodiment of the present invention. The optical head adopts a grating coupler as an input coupler and adopts a prism coupler as an output coupler.

The coupling manner of the grating coupler 143 is the same as described in the third and eleventh embodiments of the present invention, and the coupling manner of the prism coupler 133' is the same as described in the second and fifth embodiments of the present invention.

<Thirteenth Embodiment>

Figure 11C:
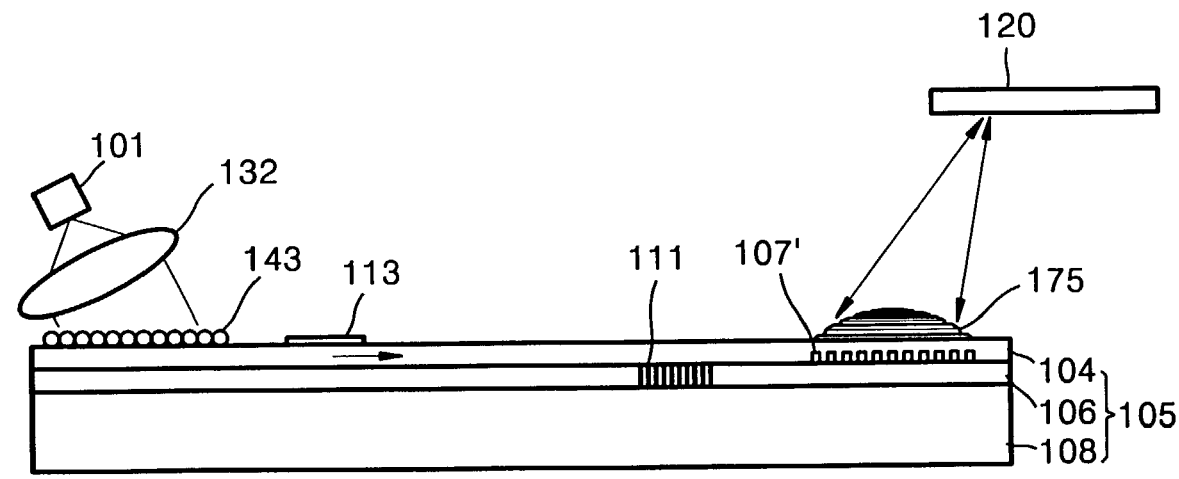
FIG. 11C is a schematic cross-section of an optical head according to a thirteenth embodiment of the present invention.

FIG. 11C is a schematic cross-section of an optical head according to the thirteenth embodiment of the present invention. The optical head adopts a grating coupler as an input coupler and adopts a grating coupler and a Fresnel lens coupler as output couplers.

The coupling manner of the grating coupler 143 is the same as described in the third embodiment of the present invention, and the coupling theories of the grating coupler 107' and the Fresnel lens coupler 175 are the same as described in the seventh embodiment of the present invention.

<Fourteenth Embodiment>

Figure 12A:
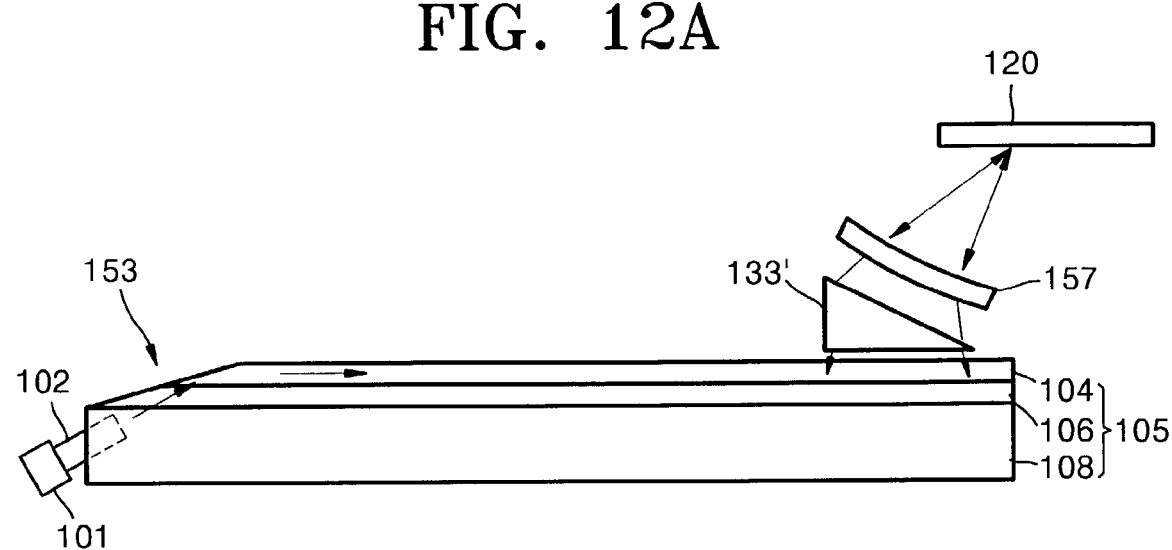
FIG. 12A is a schematic cross-section of an optical head according to a fourteenth embodiment of the present invention.

FIG. 12A is a schematic cross-section of an optical head according to the fourteenth embodiment of the present invention. The optical head adopts a tapered coupler as an input coupler and adopts a prism coupler as an output coupler.

The coupling manner of the tapered coupler 153 is the same as described in the fourth embodiment of the present invention, and the coupling manner of the prism coupler 133' is the same as described in the fifth embodiment of the present invention.

<Fifteenth Embodiment>

Figure 12B:
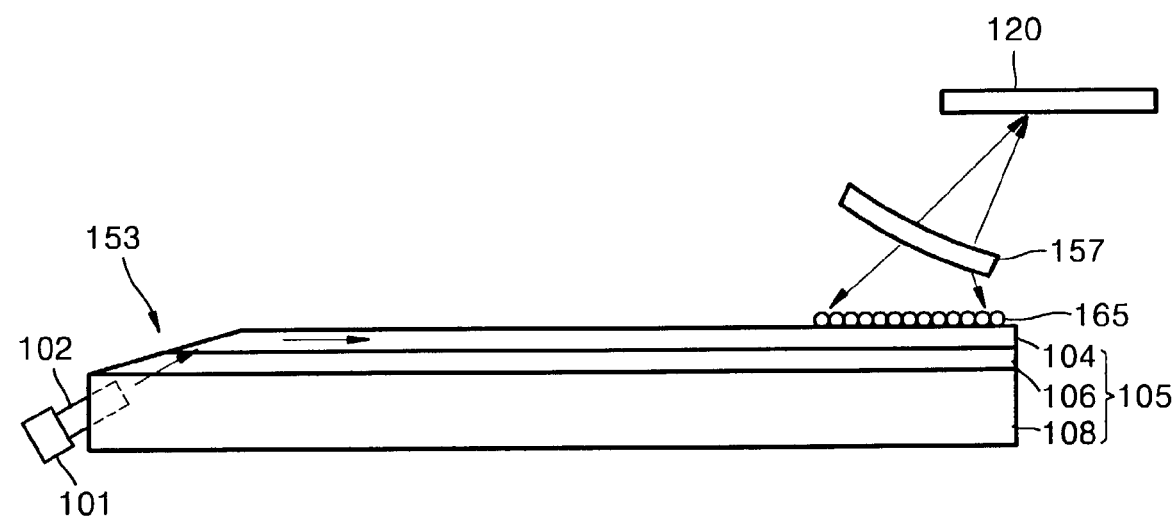
FIG. 12B is a schematic cross-section of an optical head according to a fifteenth embodiment of the present invention.

FIG. 12B is a schematic cross-section of an optical head according to the fifteenth embodiment of the present invention. The optical head adopts a tapered coupler as an input coupler and a focusing grating coupler as an output coupler.

The coupling manner of the tapered coupler 153 is the same as described in the fourth embodiment of the present invention, and the coupling manner of the focus grating coupler 165 is the same as described in the sixth embodiment of the present invention.

<Sixteenth Embodiment>

Figure 12C:
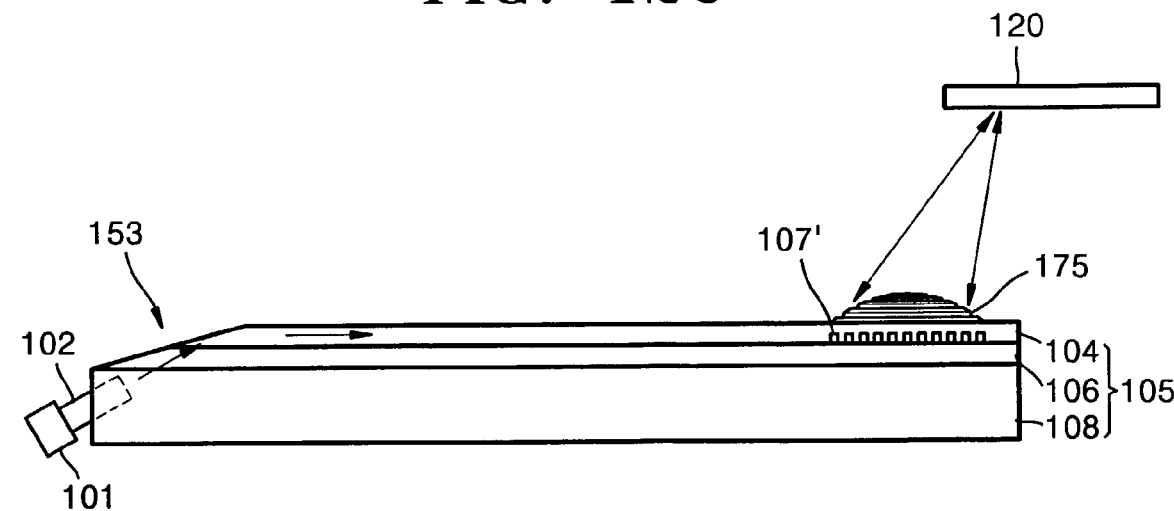
FIG. 12C is a schematic cross-section of an optical head according to a sixteenth embodiment of the present invention.

FIG. 12C is a schematic cross-section of an optical head according to the sixteenth embodiment of the present invention. The optical head adopts a tapered coupler as an input coupler and a grating coupler and a Fresnel lens coupler as output couplers.

The coupling manner of the tapered coupler 153 is the same as described in the fourth embodiment of the present invention, and the coupling manners of the grating coupler 143 and the Fresnel lens coupler 175 are the same as described in the seventh embodiment of the present invention.

<Seventeenth Embodiment>

Figure 13A:
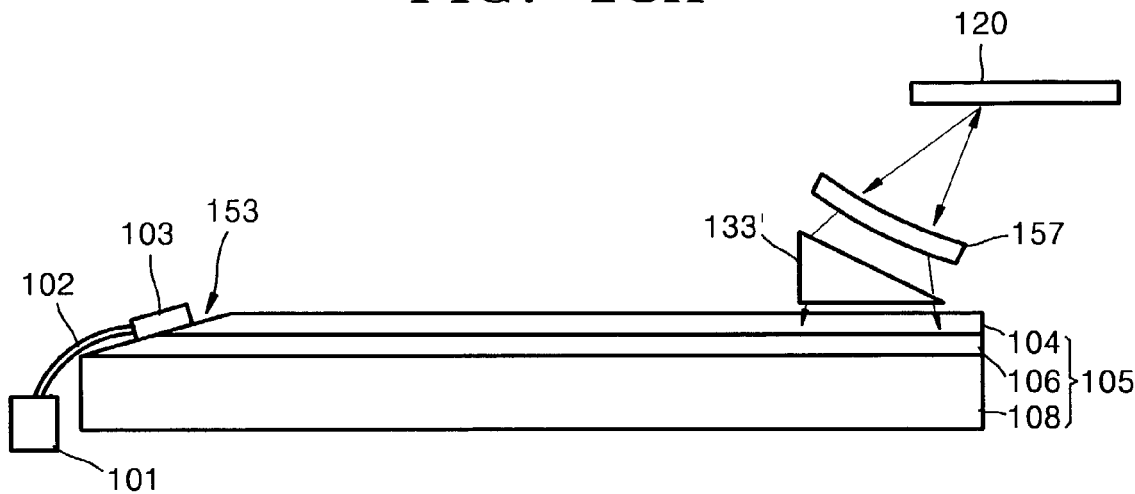
FIG. 13A is a schematic cross-section of an optical head according to a seventh embodiment of the present invention.

FIG. 13A is a schematic cross-section of an optical head according to the seventeenth embodiment of the present invention. The optical head adopts an evanescent coupler and a tapered coupler as input couplers and a prism coupler as an output coupler.

The coupling manners of the evanescent coupler 103 and the tapered coupler 153 are the same as described in the fifth embodiment of the present invention, and the coupling manner of the prism coupler 165 is the same as described in the seventh embodiment of the present invention.

<Eighteenth Embodiment>

Figure 13B:
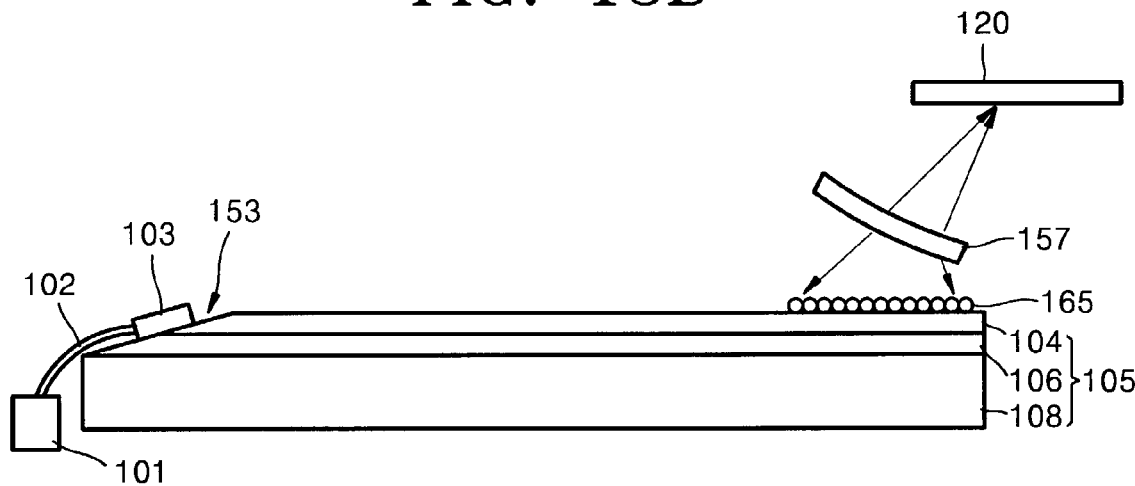
FIG. 13B is a schematic cross-section of an optical head according to an eighteenth embodiment of the present invention.

FIG. 13B is a schematic cross-section of an optical head according to the eighteenth embodiment of the present invention. The optical head adopts an evanescent coupler and a tapered coupler as input couplers and a focusing grating coupler as an output coupler.

The coupling mechanisms of the evanescent coupler 103 and the tapered coupler 153 are the same as described in the fifth embodiment of the present invention, and the coupling manner of the focusing grating coupler 165 is the same as described in the sixth embodiment of the present invention.

<Nineteenth Embodiment>

Figure 13C:
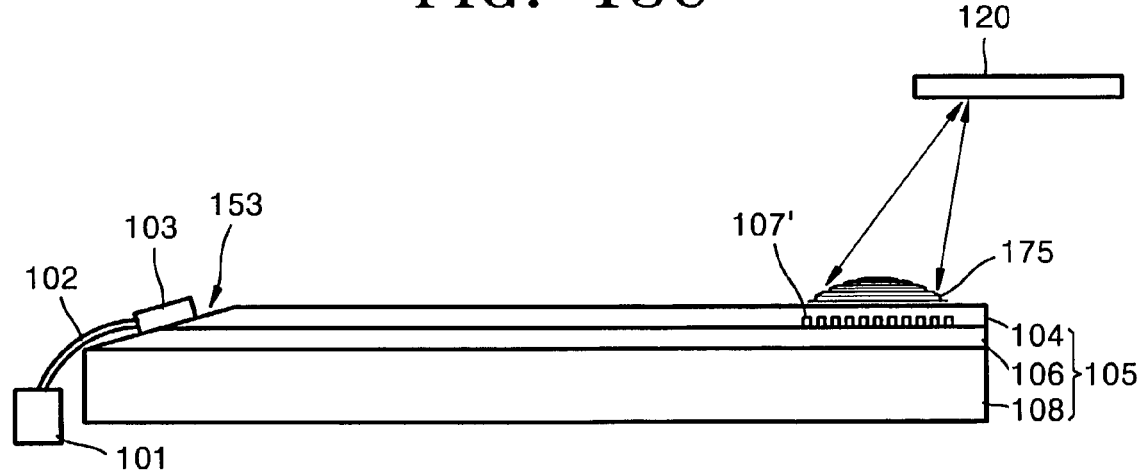
FIG. 13C is a schematic cross-section of an optical head according to a nineteenth embodiment of the present invention

FIG. 13C is a schematic cross-section of an optical head according to the nineteenth embodiment of the present invention. The optical head adopts an evanescent coupler and a tapered coupler as input couplers and a focusing grating coupler and a Fresnel lens coupler as output couplers.

The coupling manners of the evanescent coupler 103 and the tapered coupler 153 are the same as described in the fifth embodiment of the present invention, and the coupling manners of the focusing grating coupler 165 and the Fresnel lens coupler 175 are the same as described in the seventh embodiment of the present invention.

In the present invention, an evanescent coupler, a prism coupler, a grating coupler, and a tapered coupler are used as input couplers, and a prism coupler, a focusing grating coupler, and a Fresnel lens coupler are used as output couplers, so that an input coupling efficiency and an output coupling efficiency are improved. Accordingly, a compact optical head providing a light intensity enough to record information on and reproduce it from an optical disc is obtained In addition, an optical head having excellent focusing characteristics with a high numerical aperture can be obtained While the present invention has been particularly shown and described with reference to preferred embodiments thereof, it will be understood by those of ordinary skill in the art that various changes in form and details may be made therein without departing from the spirit and scope of the present invention as defined by the appended claims. For example, one of ordinary skill in the art to which the present invention pertains will be able to adopt a variety of couplers using evanescent coupling, light diffraction, and total reflection according to the technical spirit of the present invention.

As described above, the present invention improves an input coupling efficiency and an output coupling efficiency by the adoption of both an input coupler and an output coupler, so that a light intensity required to record information on and reproduce it from an optical disc can be obtained with little loss. Thus, recording and reproduction of an optical head can be improved.

In addition, a light, compact, integrated optical head having no heat sinks can be manufactured, and an integrated optical head having excellent focusing characteristics with a high numerical aperture is obtained.

What is claimed is:

1. An integrated optical head comprising:
   a light source emitting light;
   a waveguide guiding the light;
   an input coupler located at one edge of the waveguide, coupling light emitted from the light source and transmitting the coupled light to the waveguide;
   an output coupler located at another edge of the waveguide, coupling light emitted from the waveguide and focusing the coupled light on an optical disc;
   a light path changing unit installed on the waveguide, changing the light path of light that has been reflected by the optical disc and then passed through the output coupler; and
   an optical detector receiving the light passed through the light path changing unit and converting the received light into an electrical signal in order to detect information from the optical disc wherein the input coupler is an evanescent coupler, which includes an optical fiber that has one end connected to the light source, the other end connected to a surface of the waveguide, and a core closely attached to the surface of the waveguide, and evanescent-couples the light emitted from the light source and transmits the coupled light to the waveguide.

2. The integrated optical head of claim 1, wherein the light source is a laser diode.

3. The integrated optical head of claim 1, wherein the waveguide comprises:
   a substrate;
   a buffer layer deposited on the upper surface of the substrate; and
   a light guiding layer deposited on an upper surface of the buffer layer, wherein said light guiding layer is for guiding the light.

4. The integrated optical head of claim 1, wherein the output coupler is a prism coupler installed close to the surface of the waveguide, the prism coupler evanescent-coupling light emitted from the waveguide and focusing the coupled light on the optical disc.

5. The integrated optical head of claim 4, further comprising a cylindrical lens formed on the light path between the output coupler and the optical disc in order to focus light passed through the output coupler on the optical disc.

6. The integrated optical head of claim 1, wherein the output coupler is a focusing grating coupler formed on the surface of the waveguide.

7. The integrated optical head of claim 6, further comprising a cylindrical lens formed on the light path between the output coupler and the optical disc in order to focus light passed through the output coupler on the optical disc.

8. An integrated optical head comprising:
   a light source emitting light;
   a waveguide guiding the light;
   an input coupler located at one edge of the waveguide, coupling light emitted from the light source and transmitting the coupled light to the waveguide;
   an output coupler located at another edge of the waveguide, coupling light emitted from the waveguide and focusing the coupled light on an optical disc;
   a light path changing unit installed on the waveguide, changing the light path of light that has been reflected by the optical disc and then passed through the output coupler; and
   an optical detector receiving the light passed through the light path changing unit and converting the received light into an electrical signal in order to detect information from the optical disc wherein the input coupler is an evanescent coupler, which includes an optical fiber that has one end connected to the light source, the other end connected to a surface of the waveguide, and a core closely attached to the surface of the waveguide, and evanescent-couples the light emitted from the light source and transmits the coupled light to the waveguide, wherein the waveguide comprises:
   a substrate;
   a buffer layer deposited on the upper surface of the substrate; and
   a light guiding layer deposited on an upper surface of the buffer layer, wherein said light guiding layer is for guiding the light, and
   wherein the light path changing unit comprises:
   a photonic crystal mirror having a plurality of holes formed through the buffer layer in order to change the light path of light received from the output coupler; and
   a mode index lens focusing light passed through the photonic crystal mirror on the optical detector.

9. The integrated optical head of claim 1, wherein the light path changing unit is a grating beam splitter formed on the surface of the waveguide.

10. An integrated optical head comprising:
    a light source emitting light;
    a waveguide guiding the light;
    an input coupler located at one edge of the waveguide, coupling light emitted from the light source and transmitting the coupled light to the waveguide;
    an output coupler located at another edge of the waveguide, coupling light emitted from the waveguide and focusing the coupled light on an optical disc;
    a light path changing unit installed on the waveguide, changing the light path of light that has been reflected by the optical disc and then passed through the output coupler; and
    an optical detector receiving the light passed through the light path changing unit and converting the received light into an electrical signal in order to detect information from the optical disc wherein the input coupler is an evanescent coupler, which includes an optical fiber that has one end connected to the light source, the other end connected to a surface of the waveguide, and a core closely attached to the surface of the waveguide, and evanescent-couples the light emitted from the light source and transmits the coupled light to the waveguide,
    wherein the waveguide comprises:
    a substrate;
    a buffer layer deposited on the upper surface of the substrate; and
    a light guiding layer deposited on an upper surface of the buffer layer, wherein said light guiding layer is for guiding the light, and
    wherein the output coupler is a focusing grating coupler formed on the buffer layer of the waveguide in such a way that each grating has a predetermined curvature and a pitch is reduced in the traveling direction of the light, the focusing grating coupler diffracting light passed through the light guiding layer such that the light is focused on the optical disc.

11. An integrated optical head comprising:

a light source emitting light;

a waveguide guiding the light;

an input coupler located at one edge of the waveguide, coupling light emitted from the light source and transmitting the coupled light to the waveguide;

an output coupler located at another edge of the waveguide, coupling light emitted from the waveguide and focusing the coupled light on an optical disc;

a light path changing unit installed on the waveguide, changing the light path of light that has been reflected by the optical disc and then passed through the output coupler; and an optical detector receiving the light passed through the light path changing unit and converting the received light into an electrical signal in order to detect information from the optical disc wherein the input coupler is an evanescent coupler, which includes an optical fiber that has one end connected to the light source, the other end connected to a surface of the waveguide, and a core closely attached to the surface of the waveguide, and evanescent-couples the light emitted from the light source and transmits the coupled light to the waveguide, wherein the output coupler is a focusing grating coupler formed on a surface of the waveguide in such a way that each grating has a predetermined curvature and a pitch is reduced in the traveling direction of the light, the focusing grating coupler diffracting light passed through the light guiding layer such that the light is focused on the optical disc.

* * * * *